Feb. 14, 1939.  W. F. DOUBLE ET AL  2,147,285
DRIVING AXLE
Filed Dec. 13, 1935
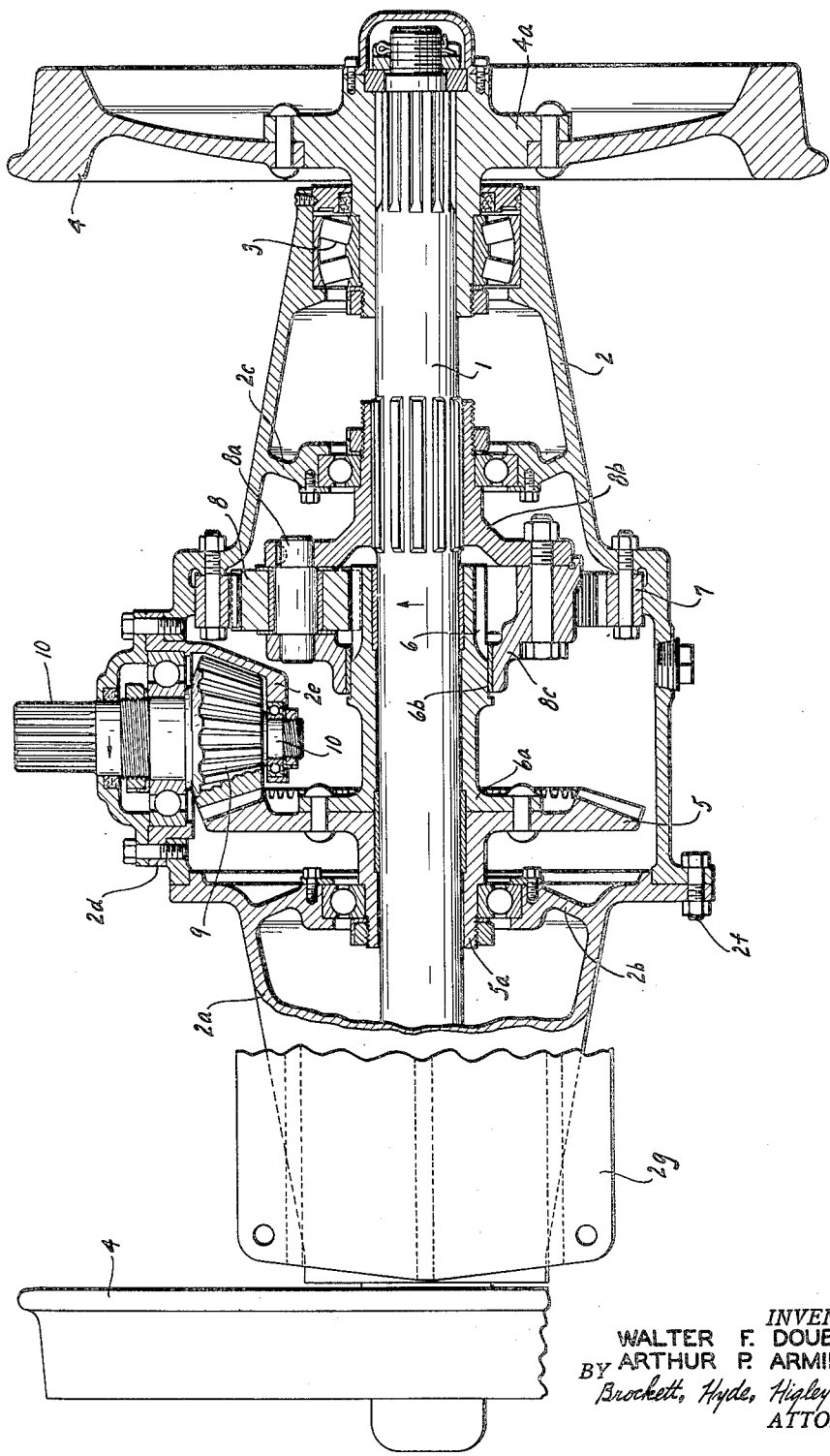
INVENTORS
WALTER F. DOUBLE &
BY ARTHUR P. ARMINGTON
Brockett, Hyde, Higley & Meyer
ATTORNEYS Patented Feb. 14, 1939

2,147,285

UNITED STATES PATENT OFFICE 2,147,285

DRIVING AXLE

Walter F. Double, Wickliffe, and Arthur P. Armington, Willoughby, Ohio, assignors to The Euclid Road Machinery Company, Euclid, Ohio, a corporation of Ohio Application December 13, 1935, Serial No. 54,220

2 Claims. (Cl. 105—117)

This invention relates to driving axles particularly adapted for rail vehicles and wherein a reduction is provided in the drive.

General objects of the invention are to provide an axle of such nature wherein the parts are located for greatest compactness and disposed to permit such bearing therebetween as will result in most advantageous mutual support of the parts and rigidity of the axle unit as a whole.

A particular object of the invention is to relieve the live axle shaft employed, so far as possible from bending and shearing stresses.

The exact nature of this invention together with further objects and advantages thereof will be apparent from the following description taken in connection with the accompanying drawing which is a plan view of a typical embodiment of the invention, parts being broken away as in typical longitudinal section to show details of construction.

With reference now to the drawing, 1 is an axle having a housing 2 therefor, with end bearings 3 in the housing and wheels 4 secured upon its ends which project beyond the housing. More in detail, the wheels have hub parts 4a splined upon the ends of the axle for alignment of the wheels and transmission of drive thereto, these hub parts extending within the ends of the housing and there carrying the internal members of the bearings 3, which latter are of self-aligning type.

Driving gear means 5 having a hub part 5a, is disposed about the axle to bear freely thereon, its hub part 5a having an external bearing as indicated, with a web part 2b of the housing. Planetary gearing is provided for driving the axle 1 at reduced speed by the driving gear means 5.

Such planetary gearing includes center pinion means 6 freely bearing upon the axle 1 and having a part 6a extending toward the driving gear 5 and rigidly connected with the latter as by the rivets indicated.

The planetary gearing also includes an internally toothed ring gear 7 located in the plane of the teeth of the center pinion 6 and secured in the housing 2 as by the bolts indicated.

Planet pinion means constitute the third element of the planetary gearing and include one or more of planet pinions 8 meshing with the center pinion 6 and with the ring gear 7. Each planet pinion 8 is mounted for free rotation upon a pin 8a, and preferably three planet pinions may be provided, uniformly spaced about the axle 1. The pins 8a are secured in a frame of spider characteristics including a part 8b on one side and a part 8c on the other, the frame being rigidly interconnected as by the bolts indicated. The part 8b is rigidly associated with the axle 1 as by the splines indicated and has an external bearing in a web 2c of the housing 2. The frame part 8c may bear upon an intermediate part 6b of the center pinion means 6 as indicated in the drawing.

The illustrated gear means 5 is of bevel type for actuation by a bevel pinion 9 carried on a drive shaft 10 which projects beyond the housing 2, this shaft 10 having an outer bearing in a removable housing closure part 2d which closure part has a bracket 2e carrying an inner bearing for the shaft 10.

The pinion 9 is located intermediate the ends of the housing 2 and between the driving gear means 5 and the described planetary reduction gearing means, these two means being spaced longitudinally of the axle for the purpose but located closely adjacent the pinion. Similarly the bearings in the housing provided by the webs 2b and 2c of the latter, are located closely adjacent the gearing parts so as to have the maximum steady effect upon the latter.

The housing generally indicated at 2, is essentially made in two pieces only, separable transversely of the axle at one side of the gearing by withdrawal of the part 2a upon removal of the bolts 2f. The wheel 4 near the part 2a having been first removed, withdrawal of the part 2a lengthwise of the axle will remove with it the driving gear means 5 and center pinion means 6 of the planetary gearing, leaving the axle 1, planet pinion means 8, and driving pinion 9, freely accessible for inspection. Complete accessibility to the planet pinion means 8 and ring gear 7 may thereafter be had if necessary, by removing the closing part 2d of the housing and with it the driving pinion 9. Should it be desired to remove the axle shaft without separating the parts of the housing, this may be accomplished by first removing the wheel shown at the left in the drawing. Thereupon the shaft may be pulled from the housing, endwise toward the right in the drawing, the right-hand wheel and its bearing 3 being withdrawn with the shaft. It may be noted that the splines by which the shaft is driven are external of the main body of the shaft whereas those by which the wheels are driven are internal, formed by recesses in the shaft, so that the relative strength of the splined parts of the shaft is nicely proportioned and its described removal is permitted.

Also it will be observed that removal of the shaft does not disturb the gearing through which it is driven. The frame or spider 8b remains supported by its bearing in the housing web 2c and the planet pinions 8, and the center pinion assembly is supported by its bearings in the web 2b and in the planet pinions. The bearing 6b also assists. For mounting the load to be carried, the housing is provided with pads 2g, one adjacent each wheel 4 and preferably cast integral with their corresponding housing parts.

As to driving operation, power applied to the shaft 10 to rotate the pinion 9, will cause actuation of the driving gear means 5 at a reduced speed. The center pinion means 6 which will be thus actuated at the same speed as the driving gear means 5, will cause the planet pinion means 8 to have cyclic motion about the ring gear 7. This will rotate the frame means 8b and with it the axle 1 at a further reduced speed. It may be observed that during operation, the rotation of the gear means 5 and center pinion 6 will be in the same direction as that of the axle so that the bearing of these parts upon the axle will have but slow speed relative thereto.

It is to be noted that by the arrangement described the function of the live axle shaft 1 is substantially only to transmit torque from the described driving gearing within the housing, to the wheels. The axle shaft is wholly relieved from shearing forces at the wheels. Each end bearing 3 is located approximately at the point of application lengthwise of the axle, of rail thrust against the wheel tread. The wheel hub within this bearing is effective to relive the axle against endwise forces owing to the self-aligning nature of the bearing. The spline connection between axle and wheel is located outwardly beyond this bearing so that the strength of the axle is unimpaired at the bearing.

What we claim is:

1. In a railway driving axle having an axle shaft, a housing therefor, a pair of wheels having hub parts extending within the ends of said housing, and bearings for said hub parts within their housing ends, means removably mounting said wheels upon said shaft to provide drive of said shaft and including splines internal of said shaft and located outwardly beyond said bearings, and means within said housing for driving said shaft and arranged to permit its endwise removal and including splines extending externally of said shaft less than said bearings.

2. In a railway driving axle having an axle shaft, a housing therefor, a pair of wheels, means for bearing said wheels within the ends of said housing, means removably mounting said wheels upon said shaft to provide drive of said wheels by said shaft, and means mounted within said housing for driving said shaft and arranged to permit its endwise removal from said housing, said driving means including splines upon said shaft, planetary reduction gearing having relatively movable elements including an element engaging said splines and another element in which said shaft has rotatable bearing, and bearing means arranged to support said gearing in said housing independently of said shaft.

WALTER F. DOUBLE.
ARTHUR P. ARMINGTON.